UNITED STATES PATENT OFFICE.

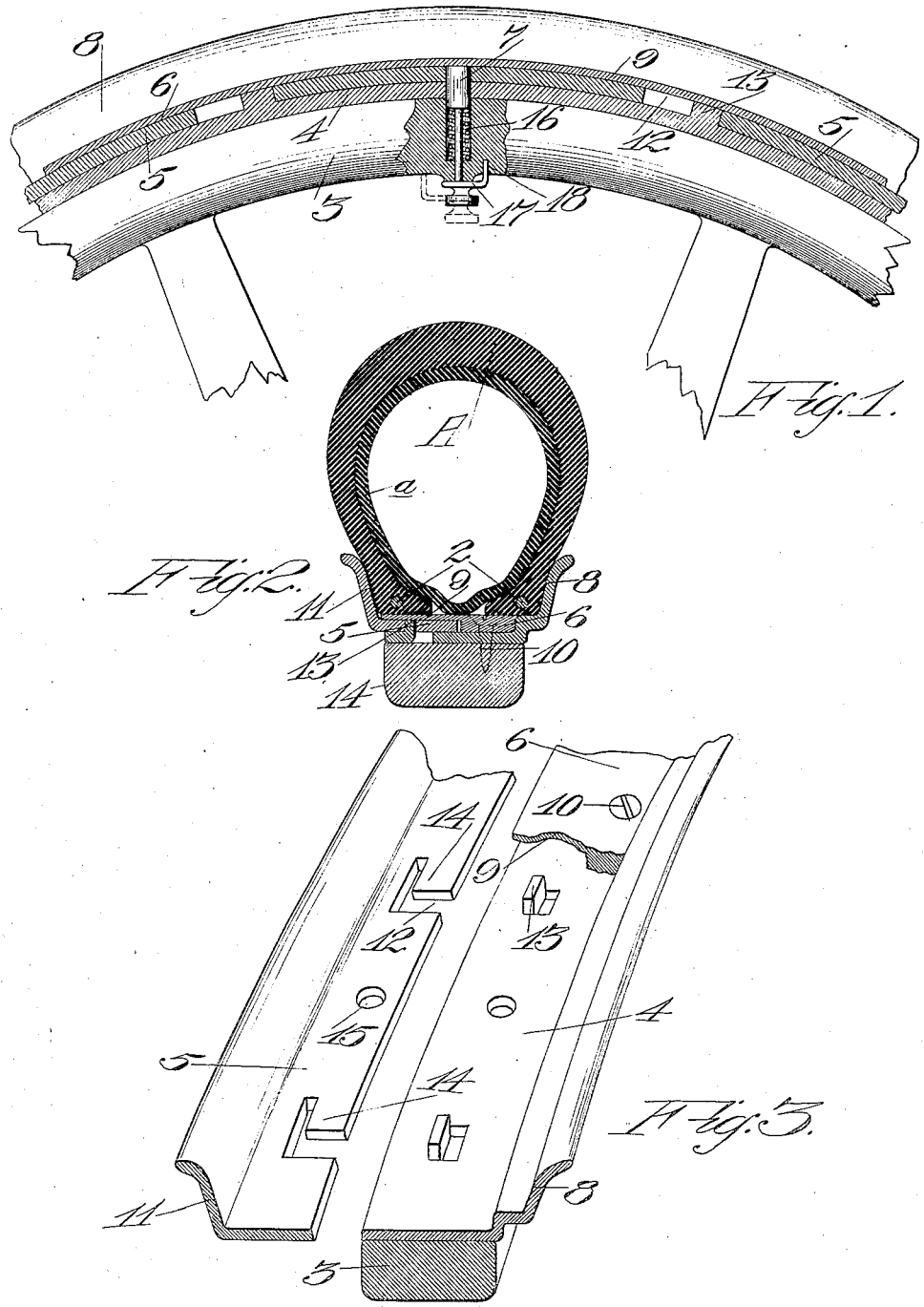

RICHARD E. JEFFERY, OF PIEDMONT, CALIFORNIA.

DETACHABLE RIM FOR AUTOMOBILE-TIRES.

No. 895,762.  Specification of Letters Patent.  Patented Aug. 11, 1908.

Application filed March 20, 1907. Serial No. 363,403.

*To all whom it may concern:*

Be it known that I, RICHARD E. JEFFERY, citizen of the United States, residing at Piedmont, in the county of Alameda and State of California, have invented new and useful Improvements in Detachable Rims for Automobile-Tires, of which the following is a specification.

My invention relates to wheel rims, and it especially pertains to a sectional rim for automobile tires. Its object is to provide a rim which will permit a rubber tire to be taken off or put on easily, especially where the tires are provided with steel rings or cables along their inner seating portions.

The invention consists of the parts and the construction and combination of parts as hereinafter more fully described and claimed, having reference to the accompanying drawings, in which—

Figure 1 is a side elevation in partial section of part of my rim. Fig. 2 is a cross-section of my rim and tire. Fig. 3 is a perspective of the two rim sections separated showing their construction.

A represents a tire of usual construction provided with the solid steel rings or cables 2 to prevent the tire stretching. These rings or cables while strengthening the tire make it necessary to have some sort of a rim by which the tires can be slipped on or off from the sides as the rings do not stretch any. My improved rim, while designed especially for this kind of a tire is manifestly applicable to other tires.

3 represents a wooden rim to which the spokes attach, and 4—5 are rim sections which together with the ring 6 and locking devices 7 constitute the main features of my invention.

The section 4 is fixed to the rim portion 3 and is hereafter referred to as the fixed or stationary section. In the preferred construction of my rim the section 4 is made with a suitably shaped annular flange 8 to support one side of the tire, and the top of the section 4 is adapted to form a seat for the ring 6 which has a thin projecting annular portion 9 between which and the subjacent part of section 4 is formed an annular pocket or seat for the horizontal portion of the removable rim section 5. The ring 6 and section 4 are secured to the rim 3 by suitable means as the screws 10. The removable section 5 has an annular flange 11 to clamp and hold the tire in opposition to flange 8.

In order to lock the sections 4—5 together against the outward movement of one from the other, I provide a form of bayonet lock as shown in Fig. 3 wherein one section as 5 has the irregular slots 12 and the other section as 4 has corresponding pins or lugs 13 to interlock with the slots 12. These pins or lugs are preferably made integral with the section 4, though their mode of construction is quite immaterial so long as they do the work. Likewise, while I prefer to make the ring 6 separate from the rim section 4, and construct them so in practice, still it is possible to form them integral; the one thing essential about these two parts 4—6, is to provide a suitable socket to receive the rim section 5 and prevent the tire or inner tube *a* being pinched or worn.

The slots 12 and lugs 13 are disposed at suitable intervals around the rim so as to give the necessary support to the rim sections and tire.

To put on the tire: the section 5 is removed and the tire slipped on sidewise over the ring 6 and section 4 and up against the fixed flange 8; the ring forming a smooth flat seat for the tire. The section 5 is then set into the socket underneath the part 9 of the rings with the open portion of the slots 12 in register with the lugs 13. Having pushed section 5 in as far as possible, it is turned to cause the lugs 13 to engage behind the shoulders 14 of the slots 12. The removable section 5 is thus securely held against outward movement from section 4. But since the sections are liable to turn back and unlock, if not otherwise secured, I provide the locking devices 7 to prevent relative rotation of the parts 4—5. These devices simply consist of spring-pressed latch-members carried by the rim 3 and engageable with holes 15 in the removable section 5. The springs 16 normally project the latches 7 outward into operative position. The latches carry the offset pins 17, which fit holes 18 in rim 3 when the latches are engaged with section 5. When however it is desired to remove the section 5 for any reason, the latches are thrown into inoperative position by simply pulling them towards the center of the wheel until the projections 17 are free of their holes 18, then turning the latches a trifle and releasing them to allow the pins to come down on the solid part of the rim 3; the pins 17 being long enough to prevent the inner end of the latches coming into interference with section 5 in its removal or replacement. When the rim sections and tire are properly assembled, it is only necessary to turn the latches to bring the pins 17 into line with their respective holes 18 and leave go of the latches, whereupon they spring into place and lock the parts securely together.

Any suitable means not necessary here to be shown or described may be employed to effect the rotation of the movable section 5 with respect to section 4, to cause the lugs to interlock with the slots.

It is possible that various modifications and changes may be made in the invention without departing from the principle of the invention as embodied in the claim.

Having thus described my invention, what I claim and desire to secure by Letters Patent, is—

A wheel rim comprising a rim portion, a rim section surrounding said portion and secured thereto, said section having an annular flange surrounding one edge, a ring thickened along one edge and secured to said section, and having the remaining portion reduced in thickness to form an annular socket between the reduced portion and the corresponding portion of said section, and a removable section having an annular flange surrounding one edge and having bayonet-slots opening through the inner edge, said inner edge of the removable section being adapted to enter edgewise and be inclosed in the socket formed beneath the ring, lugs struck up from the face of the fixed section and adapted to enter and interlock with the bayonet slots of the removable section, and spring pressed latches carried by the rim and passing through the fixed and removable sections to lock the sections, said latches having offsets normally fitting perforations in the fixed section, said latches being capable of a limited rotated movement to carry said offsets out of said perforations to thereby hold the latches in inoperative position.

In testimony whereof I have hereunto set my hand in presence of two subscribing witnesses.

RICHARD E. JEFFERY.

Witnesses:
ROBERT B. GAYLORD,
E. SHERON.